United States Patent
Hu

(10) Patent No.: US 7,447,196 B2
(45) Date of Patent: Nov. 4, 2008

(54) WIRELESS NETWORKING COMMUNICATION SYSTEM AND COMMUNICATING METHOD FOR VOIP

(75) Inventor: Ta-Hsiung Hu, Taipei (TW)

(73) Assignee: Kinghood Technology Co., Ltd., Taipei (TW)

( * ) Notice: Subject to any disclaimer, the term of this patent is extended or adjusted under 35 U.S.C. 154(b) by 277 days.

(21) Appl. No.: 11/257,007

(22) Filed: Oct. 25, 2005

(65) Prior Publication Data

US 2007/0093205 A1    Apr. 26, 2007

(51) Int. Cl.
*H04L 12/66* (2006.01)
(52) U.S. Cl. ...................... 370/352; 370/338
(58) Field of Classification Search ................. 370/338, 370/352–356; 455/432.2, 552.1, 41.2
See application file for complete search history.

(56) References Cited

U.S. PATENT DOCUMENTS

2004/0105428 A1* 6/2004 Hukkanen ................. 370/352
2005/0286466 A1* 12/2005 Tagg et al. ................. 370/329

* cited by examiner

*Primary Examiner*—Suhan Ni
(74) *Attorney, Agent, or Firm*—Bacon & Thomas, PLLC

(57) ABSTRACT

A wireless networking communication system is disclosed. The wireless networking communication system includes a wireless communicating gateway connected to a personal computer, which in turn connects with a network, and a handheld communicating device in communication with a first communicating transceiver. The wireless communicating gateway includes the first communicating transceiver, and a first processor for determining type of operating system of the computer and detecting connection of the computer to the network. The handheld communicating device includes a second communicating transceiver in communication with the wireless communicating gateway, and a second processor for converting voice signals into digital signals and detecting connection of the wireless communicating gateway to the network.

4 Claims, 5 Drawing Sheets ated into a voice. Thus, the communication is established. That is a basic principle of VOIP according to the prior art.

WIRELESS NETWORKING COMMUNICATION SYSTEM AND COMMUNICATING METHOD FOR VOIP

FIELD OF THE INVENTION

This invention relates to a wireless networking communication system and a communicating method for VOIP (Voice Over Internet Protocol).

BACKGROUND OF THE INVENTION

Recently, a lot of companies consider making use of VOIP, because VOIP could save a great deal of telephone bills. Please refer to FIG. 1. It illustrates a flowchart of using VOIP according to the prior art. As shown in FIG. 1, an IP address corresponds to a telephone number. Dialing the telephone number is equivalent to a connection of the IP address to the Internet. Next, a voice is compressed by software for convenience of transmission via the Internet, which the compressed voice is digitalized. The compressed and digitalized signal could be transmitted to a receiver via IP-to-IP communication and then decompressed into a voice. Thus, the communication is established. That is a basic principle of VOIP according to the prior art.

The current VOIP has two communicating types as shown in FIGS. 2A and 2B. FIG. 2A illustrates a communicating type of peer-to-peer, wherein the communication is established merely via an application program in peer-to-peer manner. Generally, this method only introduces an Internet connection fee without any extra expenses. Presently, there are a lot of freeware programs available, such as SKYPE®. However, a user of this communicating type could communicate with another user only when these two users use the same application program. Such a user could not communicate with mobile phones or fixed telephones directly. FIG. 2B illustrates another VOIP communicating type. The user can be connected to another IP phone via a VOIP server, and the server is further connected with a switch, such that the IP phone can communicate with an external client user, such as fixed phone user or mobile phone user. Therefore, the user could communicate with any phone user. However, the user has to pay the service provider.

On the other hand, the prior art VOIP needs the cost of initialization. Furthermore, the quality of the Internet communication is not stable all the time. Moreover, there is a compatibility problem between a caller and a receiver—they should use the same application program or connect to the same service provider for communication. Therefore, the VOIP could not be popularized rapidly. Certainly, improving the bandwidth of network and developing new application programs could solve those problems.

SUMMARY OF THE INVENTION

Accordingly, the present invention tends to introduce an application program embedded in a wireless communicating gateway and a handheld communicating device for overcoming the drawback of inconvenience. A user could plug the wireless communicating gateway into a computer having Internet connection and then a VOIP phone could be initialized and operated via the handheld communicating device. Meanwhile, the user does not have to install the application program again, and does not have to configure the network. A user who is not familiar with operation of a computer could also use a VOIP phone easily with the aid of the handheld communicating device. Thus, the convenience and the intention of using a VOIP phone could be increased. On the other hand, the wireless communicating gateway connected with the Internet could be connected to a server of a service provider in order to access personal information exclusively for the user, such as phone book, calendar, short message, and documents, and then the personal information is transmitted to the handheld communicating device and stored in a memory device for use and reference.

In accordance with an aspect of the present invention, a wireless networking communication system is disclosed. The wireless networking communication system includes a wireless communicating gateway connected to a computer, which in turn connects with a network, and a handheld communicating device. The wireless communicating gateway includes a first communicating transceiver and a first processor for determining type of operating system of the computer and detecting the connection of the computer to the network. The handheld communicating device in communication with the first communicating transceiver includes a second communicating transceiver in communication with the wireless communicating gateway, and a second processor for converting voice signals into digital signals and detecting connection of the wireless communicating gateway to the network.

Certainly, the first communicating transceiver complies with Bluetooth specification.

Certainly, the first communicating transceiver complies with IEEE (Institute of Electrical and Electronics Engineers) 802.1x protocol.

Preferably, the wireless communicating gateway connects with said computer via a USB (Universal Serial Bus).

Certainly, the second communicating transceiver complies with Bluetooth specification.

Certainly, the second communicating transceiver complies with IEEE (Institute of Electrical and Electronics Engineers) 802.1x protocol.

Preferably, the network is the Internet.

Preferably, the handheld communicating device further comprises a memory device, and data stored in the memory device is in synchronization with corresponding data from a server of the network.

It is another object of the present invention to provide a communicating method for VOIP, including the steps of: a) connecting a handheld communicating device with a personal computer via a wireless communicating gateway; b) detecting type of operating system of the computer; c) activating a corresponding connection of the computer to a network according to the type of the operating system; and d) programming the handheld communicating device to effectuate communication based on phone type used by a remote user.

Preferably, the network is the Internet.

Certainly, the handheld communicating device and the wireless communicating gateway comply with Bluetooth specification.

Certainly, the handheld communicating device and the wireless communicating gateway comply with IEEE (Institute of Electrical and Electronics Engineers) 802.1x protocol.

Preferably, the communicating method according to the present invention further includes between step c) and step d) the steps of: connecting the computer with a server via the network and synchronizing data in the handheld communicating device with corresponding data from the server.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENT

Figure 1:
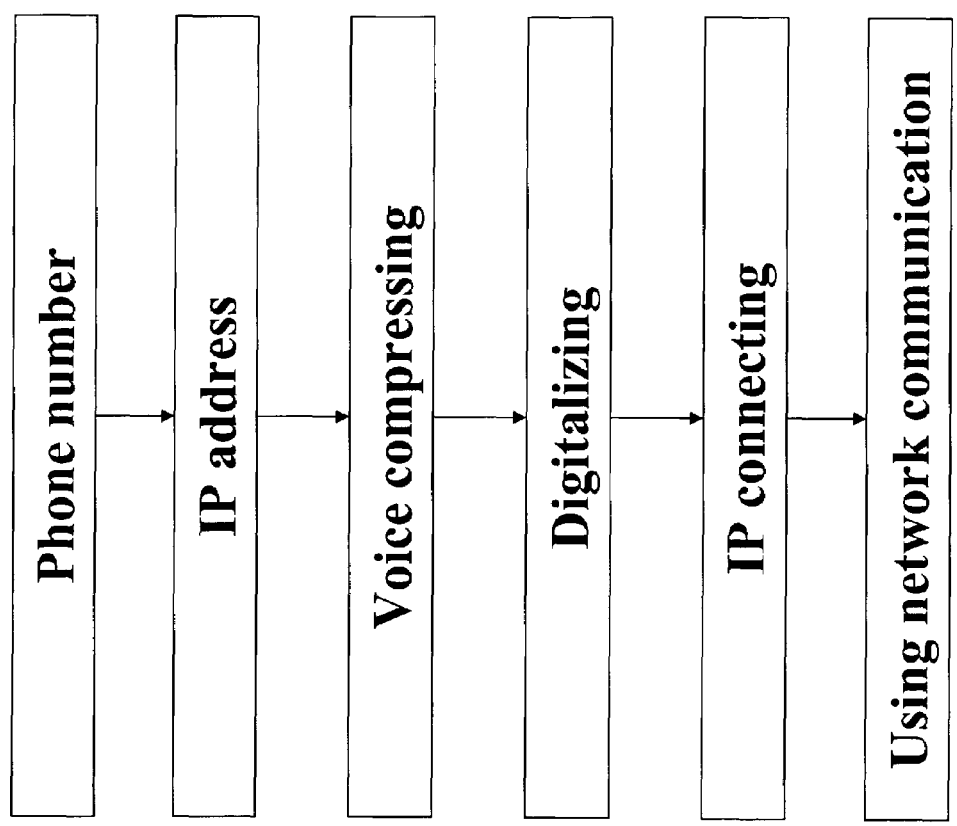
FIG. 1 is a flowchart of using VOIP according to the prior art.
Figure 2A:
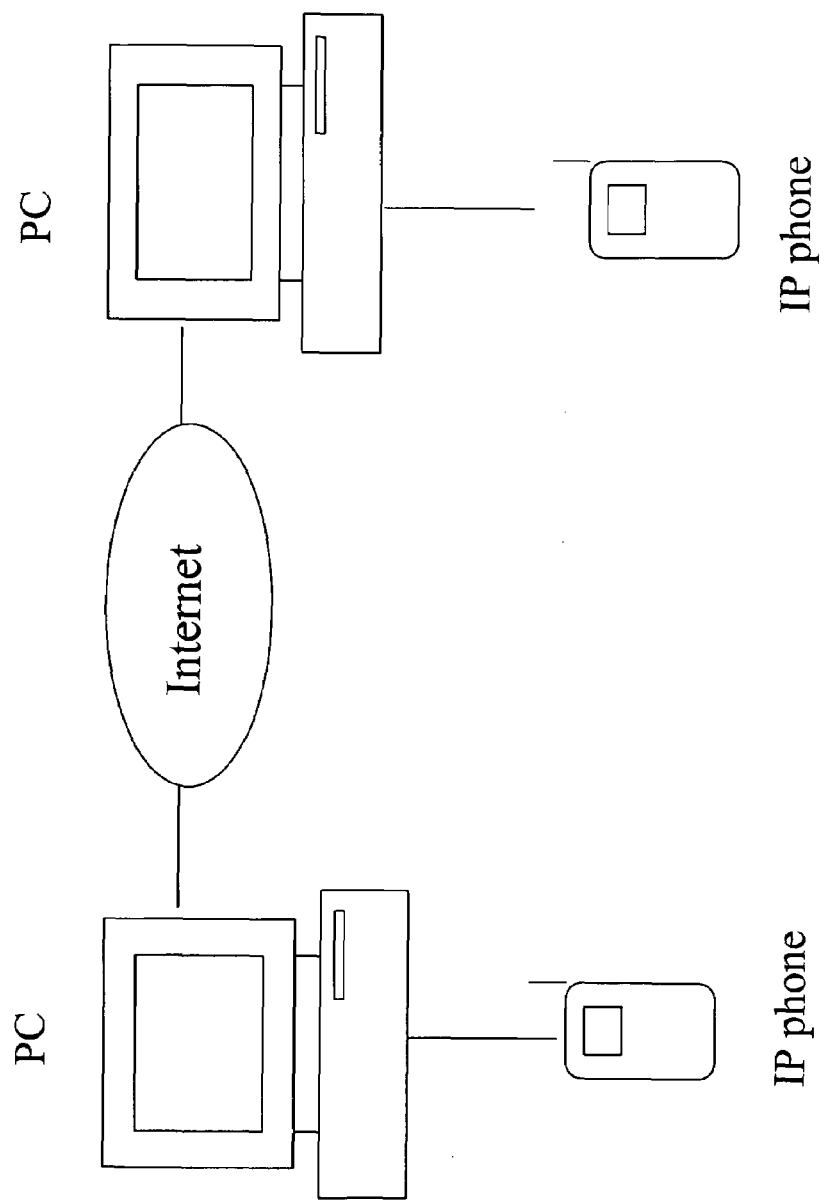
FIGS. 2A and 2B illustrate two different conventional VOIPs.
Figure 2B:
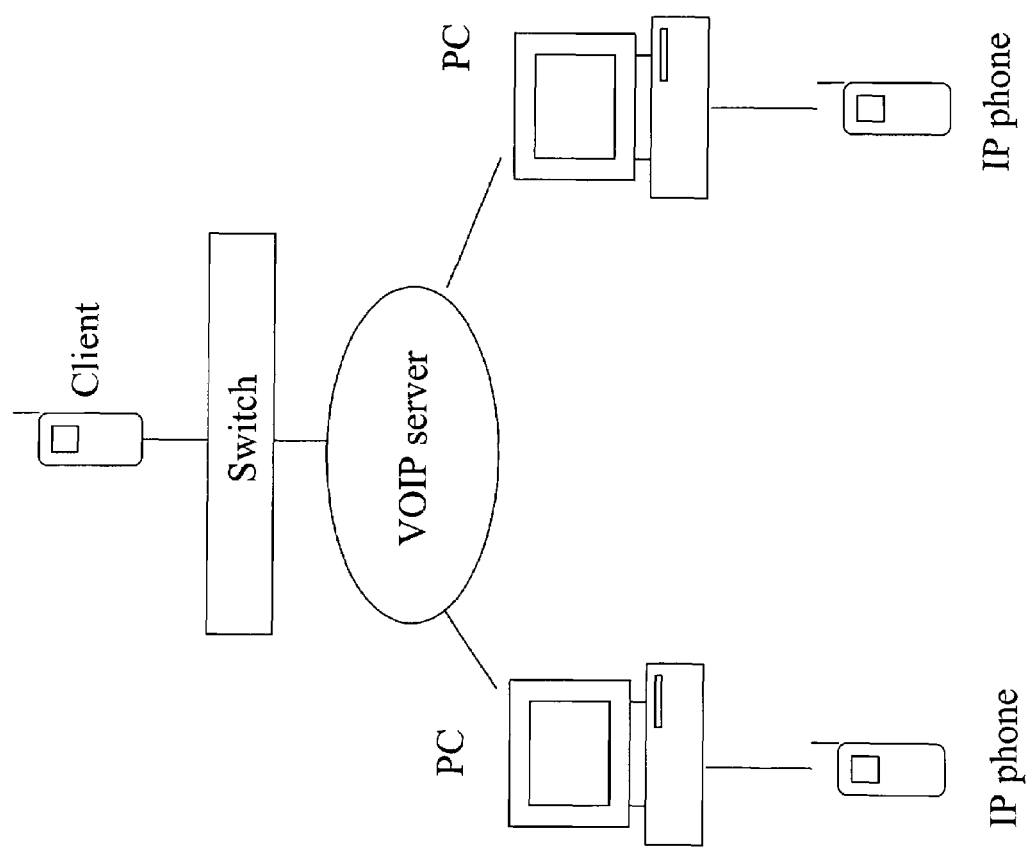
Figure 3:
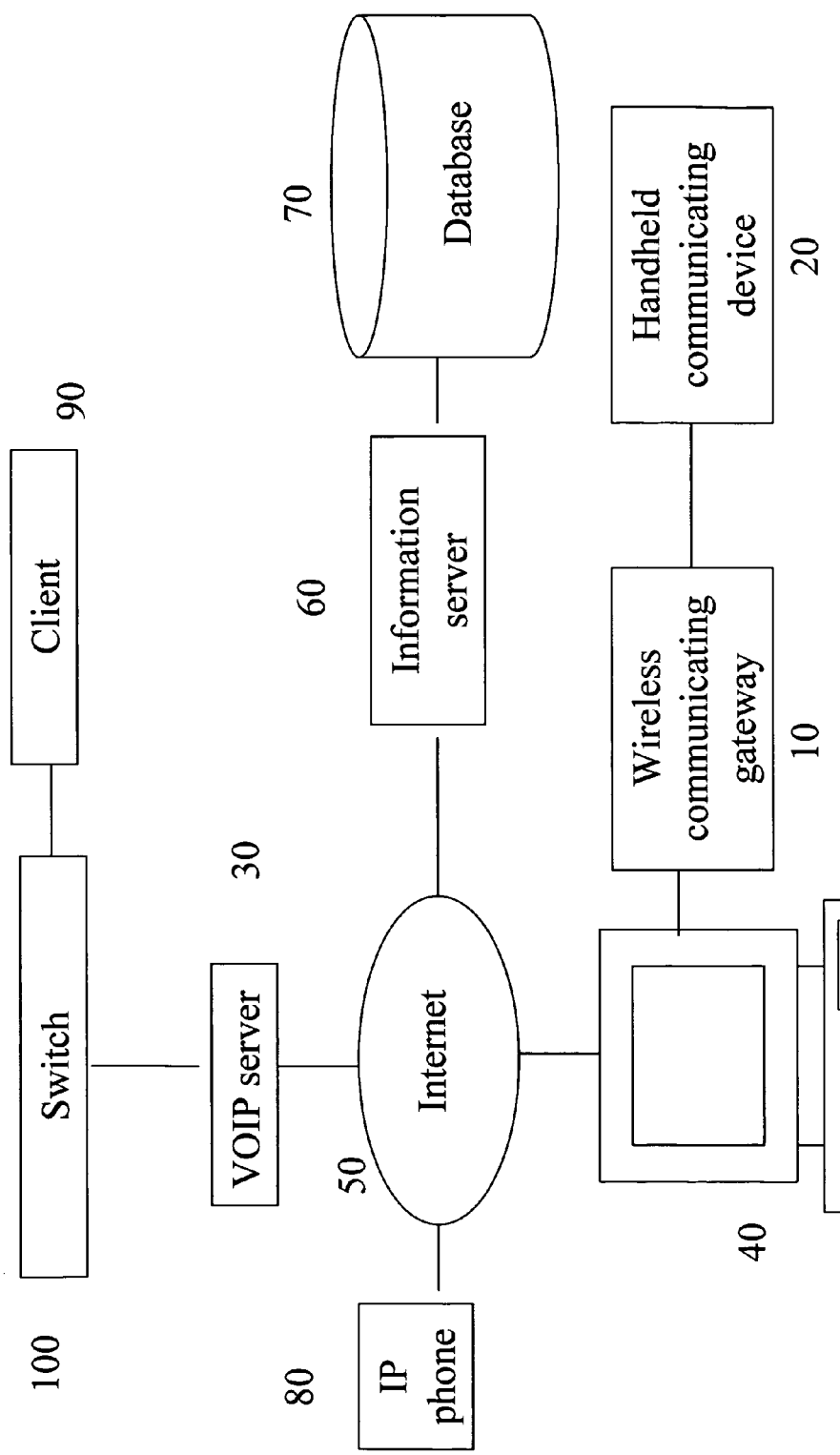
FIG. 3 illustrates a preferred embodiment of an outside wireless networking communication system according to the present invention.
Figure 4:
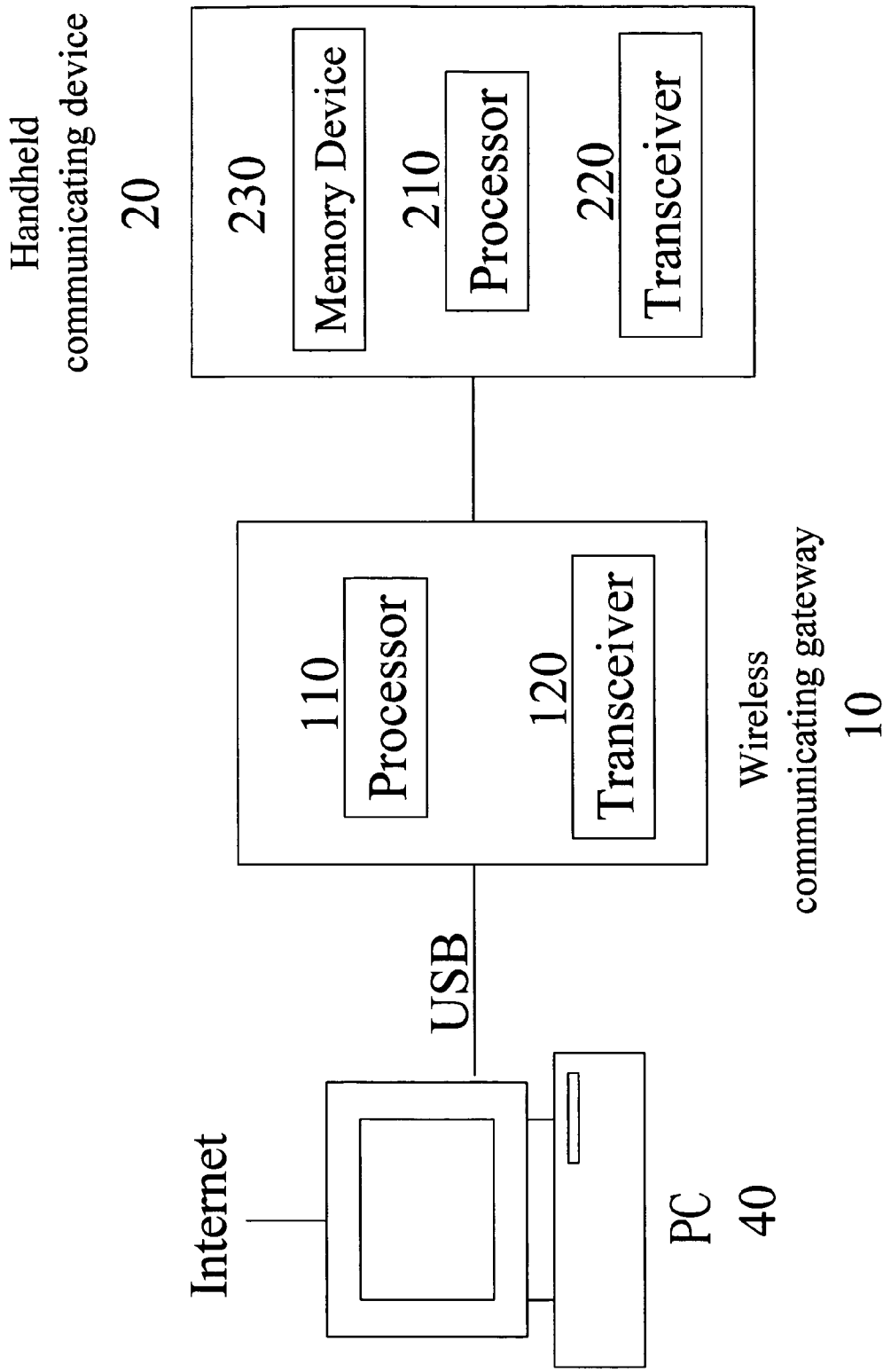
FIG. 4 illustrates a preferred embodiment of an inside wireless networking communication system according to the present invention.

FIG. 3 and FIG. 4 illustrate a preferred embodiment of a wireless networking communication system according to the present invention. As shown in FIG. 3 and FIG. 4, when a personal computer 40 is connected with the Internet 50, a wireless communicating gateway 10 would determine the operating system of the personal computer 40 and then activate the connection between the wireless communicating gateway 10 and the Internet 50 through the personal computer 40. After that, the computer 40 will be connected to a database 70 of a information server 60 via the Internet 50. According to comparison of the data stored in a memory device 230 of a handheld communicating device 20 with the data of the database 70, if there is update information in the database 70, the update information will be downloaded automatically to synchronously update the data in the memory device 230 of the handheld communicating device 20 by means of wireless communication.

When a user wants to make an IP phone call a processor 210 of the handheld communicating device 20 will determine the phone type of a remote user. The phone type can be any IP phone using, for example, SKYPE®, YAHOO®, or other IP phone programs, and it can also be a fixed phone, mobile phone or IP phone using VOIP service. Then the processor 210 will program the handheld communicating device 20 to effectuate communication according to the phone type of the remote user.

The wireless communication between communicating transceivers 120 and 220 can comply with Bluetooth or IEEE 802.1x standard. If the remote user uses an IP phone 80, a voice signal would be transmitted by means of peer-to-peer type. If the remote user uses a client 90, such as fixed phone or mobile phone, the signal will be transmitted via a VOIP server 30 and switch 100. Usually, the information server 60 and the VOIP server 30 belong to the same Internet service provider.

Certainly, a local area network (LAN) or other small-scaled network with IP connection and PC interface could be applied to the present invention.

The IP phone of the prior art has another drawback. If a user does't execute an associated program of IP phone, such as SKYPE®, a remote user cannot determine the status of the IP phone user and cannot leave a message. The IP phone user has to apply to a telecommunication company for a phone number, and then the external client user could dial to the IP phone via the telecommunication company. In contrast, the wireless communicating gateway of the present invention has a function of automatic connection, and further has several functions supplied by the information server 60, the database 70 and the VOIP server 30, thereby avoiding the drawbacks of the conventional IP phone.

When the wireless communicating gateway 10 of the present invention connects with a personal computer 40, the connection and communication will be initialized automatically. When a remote user dials the phone number established in the memory device 230 of the handheld communicating device 20, the processor 220 will turn the handheld communicating device 20 into a state of leaving message if the user of the handheld communicating device 20 is in a meeting or any other unavailable status. Furthermore, the information server 60 would inform the remote user of the status, thereby improving the performance of IP phone. As a result, the IP phone according to the present invention has advantages provided by mobile phones and office telephones, and is capable of decreasing telephone bill. Thus, remote users would be willing to dial to the IP phone.

The processor 210 of the handheld communicating device 20 of the present invention further includes several IP-phone software programs, such as SKYPE®, YAHOO®, GOOGLE®, etc. If a user of the handheld communicating device 20 dials to an IP phone user using one of the above software programs, the same program built in the handheld communicating device 20 will be executed correspondingly, thereby achieving communication with the IP phone user via the Internet 50 without the need of a telephone switchboard or extra fees.

The wireless communication between the wireless communicating gateway 10 and the handheld communicating device 20 can comply with Bluetooth or IEEE 802.1x standard, based on the needs for bandwidth and distance therebetween.

Moreover, a manager of a company that has a number of users could update the information in the database 70 or send emails to the users, such that when one of the users gets online the updated information or emails could be transmitted to the user and stored in the memory device 230. The users could communicate by means of using the IP phones, so that the manager is able to control the status of each of the users for easy administration and less communicating expenses.

In addition to the advantages mentioned above, in this embodiment, the handheld communicating device 20 consumes less power than an ordinary mobile phone. Thus, the present invention can optimize tradeoff between cost and convenience, and improve the drawbacks of the conventional wireless IP phone.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A wireless networking communication system, comprising:

means for storing a plurality of network communicating application programs;

a wireless communicating gateway connected to a computer, which in turn connects with a network, said wireless communicating gateway including:

a first communicating transceiver; and a first processor for determining which operating system said computer is using, detecting connection of said computer to said network, and executing one of said plurality of network communicating application programs by operating on said operating system; and a handheld communicating device in communication with said wireless communicating gateway, said handheld communicating device including:
a second communicating transceiver in communication with said first communicating transceiver; and
a second processor for converting voice signals into digital signals and transmitting said digital signals to said wireless communicating gateway via said second communicating transceiver.

2. The wireless networking communication system according to claim 1, wherein said wireless communicating gateway connects with said computer via a USB (Universal Serial Bus).

3. The wireless networking communication system according to claim 1, wherein said network is the Internet.

4. The wireless networking communication system according to claim 1, wherein said handheld communicating device further comprises a memory device, and data stored in the memory device is in synchronization with corresponding data from a server of the network.

* * * * *